US011881892B2

(12) United States Patent
Dominguez-Gonzalez et al.

(10) Patent No.: US 11,881,892 B2
(45) Date of Patent: Jan. 23, 2024

(54) WIRELESS OPTICAL COMMUNICATION DEVICE

(71) Applicant: OLEDCOMM, Vélizy-Villacoublay (FR)

(72) Inventors: Carlos Dominguez-Gonzalez, Sèvres (FR); Clément Lartigue, Clamart (FR); Bastien Bechadergue, Malakoff (FR); Benjamin Azoulay, Paris (FR)

(73) Assignee: OLEDCOMM, Vélizy-Villacoublay (FR)

( * ) Notice: Subject to any disclaimer, the term of this patent is extended or adjusted under 35 U.S.C. 154(b) by 71 days.

(21) Appl. No.: 17/775,830

(22) PCT Filed: Nov. 3, 2020

(86) PCT No.: PCT/FR2020/051985
§ 371 (c)(1),
(2) Date: May 10, 2022

(87) PCT Pub. No.: WO2021/094669
PCT Pub. Date: May 20, 2021

(65) Prior Publication Data
US 2022/0385361 A1    Dec. 1, 2022

(30) Foreign Application Priority Data

Nov. 14, 2019 (FR) ...................................... 1912700

(51) Int. Cl.
*H04B 10/116* (2013.01)
*H05B 47/195* (2020.01)

(52) U.S. Cl.
CPC ......... *H04B 10/116* (2013.01); *H05B 47/195* (2020.01)

(58) Field of Classification Search
CPC ............................ H04B 10/116; H05B 47/195
(Continued)

(56) References Cited

U.S. PATENT DOCUMENTS 9,432,117 B2 *  8/2016  Chen .................... H04B 10/116
9,455,787 B2 *  9/2016  Byers .................... H04L 1/0002
(Continued)

FOREIGN PATENT DOCUMENTS

FR        3 046 255 A1     6/2017
WO    WO 2018/086842 A1   5/2018
WO    WO 2019/016024 A1   1/2019

OTHER PUBLICATIONS

International Search Report as issued in International Patent Application No. PCT/FR2020/051985, dated Feb. 23, 2021.

*Primary Examiner* — Dalzid E Singh
(74) *Attorney, Agent, or Firm* — Pillsbury Winthrop Shaw Pittman LLP (57) ABSTRACT

An optical wireless communication device includes a processing component which is configured to produce transmitted digital signals during transmission periods; a light source which is configured to produce transmitted light signals from transmitted analog signals; a shutdown circuit which is configured to selectively activate or deactivate the light source; the processing component including a binary output to which it applies a binary control signal which is in a first state during the transmission periods and in a second state outside the transmission periods, the shutdown circuit being configured to activate the light source when the binary control signal is in the first state and to deactivate the light source when the binary control signal is in the second state.

11 Claims, 5 Drawing Sheets

(58) Field of Classification Search
USPC .......................................................... 398/172
See application file for complete search history.

(56) References Cited

U.S. PATENT DOCUMENTS

| | | | | |
|---|---|---|---|---|
| 9,474,132 B1* | 10/2016 | Lee | ........................ | H05B 47/19 |
| 2015/0098708 A1* | 4/2015 | Kido | ...................... | H05B 45/37 |
| | | | | 398/118 |
| 2019/0098723 A1* | 3/2019 | Sadwick | ................. | F21K 9/272 |
| 2020/0295827 A1* | 9/2020 | Watanabe | ............ | H04B 10/112 |

\* cited by examiner

WIRELESS OPTICAL COMMUNICATION DEVICE

CROSS-REFERENCE TO RELATED APPLICATIONS

This application is the U.S. National Stage of PCT/FR2020/051985, filed Nov. 3, 2020, which in turn claims priority to French patent application number 1912700 filed Nov. 14, 2019. The content of these applications are incorporated herein by reference in their entireties.

BACKGROUND OF THE INVENTION

Optical Wireless Communication (OWC) technology is now being widely deployed.

An example of a bidirectional application using this technology is the following.

LiFi is a subset of OWC technology that allows access to a wireless network (e.g., Internet) through light. A LiFi (for Light Fidelity) access point is positioned on the ceiling of a room. The LiFi access point is connected by an optical fiber or by an electrical cable to a local or public network such as the Internet. The electrical cable is for example an Ethernet cable. The LiFi access point is possibly powered via the Ethernet cable (this is called PoE, for Power over Ethernet).

A computer (or any other compatible device: smartphone, tablet, etc.) is in the room. A LiFi dongle is connected to the computer (the term dongle is sometimes replaced in French by the term "sentinel"). The computer and the LiFi dongle are positioned in the coverage area of the LiFi access point, so that a communication is established between the LiFi access point and the LiFi dongle. The computer is thus connected to a network via the LiFi dongle and the LiFi access point.

Computer networking using optical wireless communication technology has many advantages over traditional radio frequency communications. The high speed and low latency that this technology allows to reach can for example be mentioned, as well as the availability of the bandwidth, the reduction of the risks related to the electromagnetic waves, the reduction of the risks of hacking, etc.

To improve the range and quality of the optical wireless communication, it is envisaged to increase the light intensity (e.g., infrared) produced by the Li-Fi access point and the Li-Fi dongle.

However, the increase in light intensity raises two problems.

The first problem concerns the power consumption of the Li-Fi dongle, which must remain as low as possible. At the very least, it is important to respect the power supply capacities of the connection standard used, for example USB2.0. If the current drawn or the voltage required is too high, the Li-Fi dongle cannot be connected to the computer. It is also advisable to minimize the consumption by the LiFi dongle of the energy stored in the computer's battery. It is also preferable to limit the heating of the LiFi dongle. A second issue is the eye safety of the users. It is essential that, despite the increase in light intensity, the user's eyes are protected even if he or she brings his or her face close to the Li-Fi access point or the LiFi dongle.

SUBJECT MATTER OF THE INVENTION

The subject matter of the invention is to limit the power consumption of an optical wireless communication device and to ensure the ocular protection of users.

SUMMARY OF INVENTION

In order to achieve this purpose, an optical wireless communication device is proposed comprising:
a processing component arranged to produce transmitted digital signals during transmission periods;
a digital-to-analog converter arranged to produce transmitted analog signals from the transmitted digital signals;
a light source arranged to produce transmitted light signals from the transmitted analog signals;
a shutdown circuit arranged to selectively activate or deactivate the light source;
wherein the processing component comprises a binary output and being arranged to generate and apply to the binary output a binary control signal which is in a first state during the transmission periods and in a second state outside the transmission periods, the shutdown circuit being arranged to receive the binary control signal, and to activate the light source when the binary control signal is in the first state and to deactivate the light source when the binary control signal is in the second state.

The shutdown circuit, controlled by the binary control signal, allows the light source to be deactivated (i.e., turned off) outside of the transmission periods, so that the light source only consumes electrical power when the optical wireless communication device according to the invention needs to transmit transmitted digital signals. The power consumption of the optical wireless communication device is thus significantly reduced.

When an obstacle, such as a user's face, is in the vicinity of the optical wireless communication device, that obstacle cuts off communication which, traditionally, in the case of a dongle, prevents it from transmitting transmitted digital signals and, in the case of an access point, prevents it from transmitting transmitted digital signals except for peripheral device search frames that include short, spaced pulses. In both cases, the eye safety of the user is not threatened.

In addition, a communication device such as the one just described id proposed, wherein the processing component is a baseband modem.

Also proposed is a communication device such as the one just described, wherein the baseband modem is an integrated circuit designed to meet with the G.hn standard (ITU G.9960/ITU G.9961/ITU G.9963/ITU G.9964).

Furthermore, a communication device such as the one just described is proposed, wherein the binary output is a GPO output (General Purpose Output).

In addition, a communication device such as the one just described is proposed, wherein the shutdown circuit comprises a transistor forming a switch controlled by the binary control signal, and wherein the light source comprises a terminal connected to a source of a bias voltage and a terminal connected to an electrical ground via the transistor.

An access point is further proposed comprising an optical wireless communication device such as the one just described.

An access point such as the one just described is also proposed, wherein the processing component is arranged to transmit, during search cycles, transmitted digital signals containing search frames for searching peripheral devices that may be connected to the access point.

An access point such as the one just described is also proposed, wherein each search cycle comprises at least one transmission period and at least one silence period, a sum of the silence periods being at least 10 times longer than a sum of the transmission periods, such that during a search cycle, the binary control signal is in the first state for a first time period at least 10 times shorter than a second time period during which the binary control signal is in the second state.

A peripheral equipment is further proposed comprising an optical wireless communication device such as the one just described In addition, a peripheral equipment such as the one described above is proposed, wherein the optical wireless communication device further comprises a photoreceiver arranged to receive received light signals and to generate received analog signals, and an analog-to-digital converter arranged to generate received digital signals from the received analog signals, the peripheral equipment being arranged to generate transmitted light signals, following a communication outage, only if the processing component previously receives received digital signals comprising peripheral device search frames transmitted by an access point.

In addition, a peripheral equipment such as the one described above is proposed, wherein the peripheral equipment is a dongle.

The invention will be better understood in the light of the following description of a particular non-limiting embodiment of the invention.

BRIEF DESCRIPTION OF DRAWINGS

Reference is made to the appended drawings, among which.

DETAILED DESCRIPTION OF THE INVENTION

Figure 1:
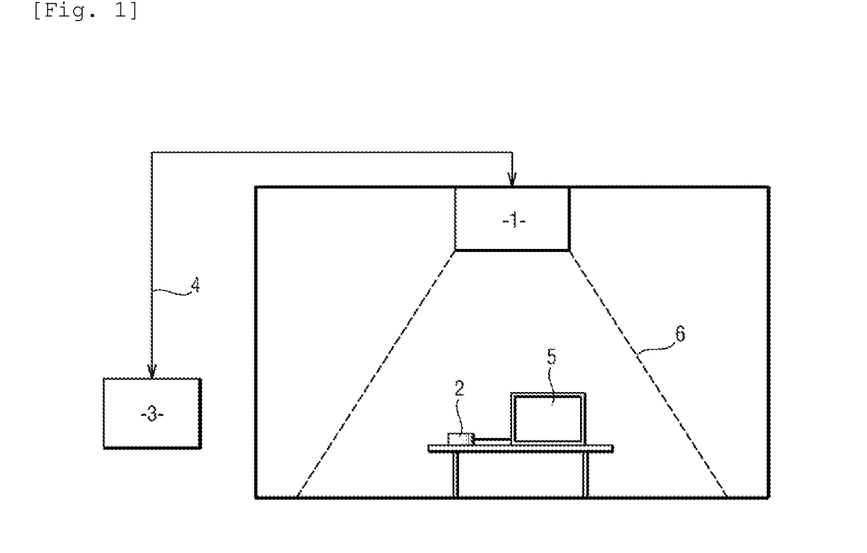
FIG. 1 represents a LiFi access point and a LiFi dongle, each of which integrates an optical wireless communication device according to the invention.

With reference to FIG. 1, a LiFi access point 1, integrating an optical wireless communication device according to the invention, and a LiFi dongle 2, also integrating an optical wireless communication device according to the invention, are located in a room of a building.

The LiFi Access Point 1 is attached to the ceiling of the room by a mechanism similar to a smoke detector mounting mechanism, or directly by flush mounting. The LiFi Access Point 1 is connected to a PoE (for Power over Ethernet) network 3 in the building via an RJ45 cable 4. The PoE network 3 also powers a telephone in the house.

The LiFi dongle 2 is connected to a computer 5 via USB (A or C). The computer 5 and the LiFi dongle 2 are positioned under the transmission cone 6 of the LiFi access point 1, so that a communication is established between the LiFi access point 1 and the LiFi dongle 2. The computer 5 is thus connected to a network via the LiFi dongle 2 and the LiFi access point 1.

Figure 2:
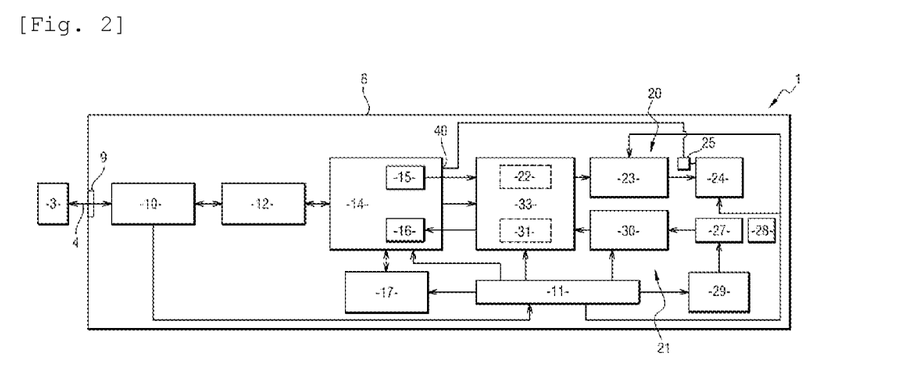
FIG. 2 represents the architecture of the Li-Fi access point.
Figure 3:
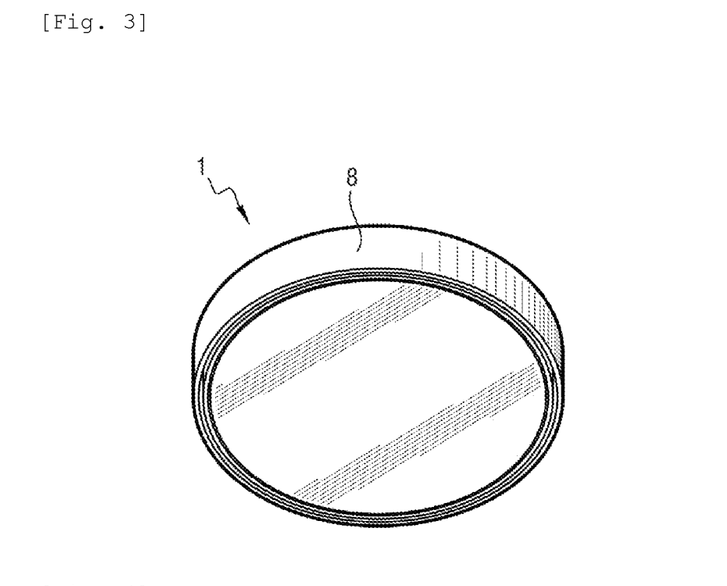
FIG. 3 is a perspective and bottom view of the Li-Fi access point.

With reference to FIGS. 2 and 3, the LiFi access point comprises a housing 8 in which first components are integrated.

The first components first include a female RJ45 connector 9 for connecting the LiFi access point 1 to the RJ45 cable 4.

The first components further include a PoE splitter 10. The PoE splitter 10 receives incoming signals containing incoming digital signals, which are Ethernet signals, combined with a primary DC supply voltage (here equal to 5V), and separates the incoming digital signals and the primary DC supply voltage.

The first components also include a DC-DC converter 11. The primary DC supply voltage is transformed by the DC-DC converter 11 into a secondary DC supply voltage used to power the first components of the LiFi access point 1.

Note that the female RJ45 connector 9, PoE splitter 10 and DC-DC converter 11 form a single data and power interface to connect the LiFi Access Point 1 in a "Plug and Play" fashion to the PoE network 3.

The first components further include an Ethernet transceiver 12 and a processing component, which in this case is a baseband modem 14.

The Ethernet transceiver 12 acquires incoming digital signals and formats them to be compatible with a format accepted by baseband modem 14. Similarly, the Ethernet transceiver 12 receives outgoing digital signals produced by the baseband modem 14 and transforms them to make them compatible with the Ethernet protocol.

The baseband modem 14 is an off-the-shelf integrated circuit (or COTS for Component Off-The-Shelf) originally designed to meet the G.hn telecommunications standard (ITU G.9960/ITU G.9961/ITU G.9963/ITU G.9964). The baseband modem 14 incorporates a digital-to-analog converter 15 and an analog-to-digital converter 16.

The baseband modem 14 generates transmitted digital signals that are input to the digital-to-analog converter 15, which converts them into transmitted analog signals that are applied to an output of the baseband modem 14. Similarly, the baseband modem 14 receives received analog signals that are applied to an input of the analog-to-digital converter 16. The analog-to-digital converter 16 converts the received analog signals into received digital signals.

The first components also include a flash memory 17 for storing and loading the various software programs programmed into the baseband modem 14.

The first components also include a transmission channel 20 and a reception channel 21.

The transmission channel 20 comprises a first amplification stage 22, a second amplification stage 23, a light source 24 and a shutdown circuit 25.

The first amplifier stage 22 has an adaptable gain, which is adjusted according to the light source 24.

The second amplification stage 23 includes an amplifier to increase the power of the transmitted analog signals. The amplifier is for example a class A amplifier, or a line driver. The second amplification stage 23 further comprises a pre-equalization module comprising for example an RC or RLC network.

The light source 24 comprises here an infrared light emitting diode (IR LED 24).

The reception channel 21 comprises a photoreceiver 27, a concentrator 28, a voltage adjustment module 29, a first amplification stage 30 and a second amplification stage 31.

The photoreceiver 27 here includes a PIN photodiode 27 that performs optoelectronic conversion. The PIN photodiode 27 is biased by the voltage adjustment module 29 to increase the bandwidth.

The concentrator 28 is mounted on the PIN photodiode 27 and allows to increase the collected optical flow and the reception coverage of the LiFi access point 1.

The first amplifier stage 30 includes a pre-amplifier module comprising a peak amplifier to increase the bandwidth.

It should be noted here that, in the case of using not one but several PIN photodiodes connected in parallel, one could plan to use a single pre-amplification module connected to the PIN photodiodes. It could also be envisaged to use one pre-amplification module per PIN photodiode, and then to sum the resulting received analog signals, thus increasing the sensitive area.

The second amplifier stage 31 has a variable gain depending on the channel condition. The variable gain is controlled by the baseband modem 14.

The first amplifier stage 22 of the transmission channel 20 and the second amplifier stage 31 of the reception channel 21 are integrated in the same component 33, which is an analog front-end circuit. The component 33 is here an off-the-shelf component.

Figure 4:
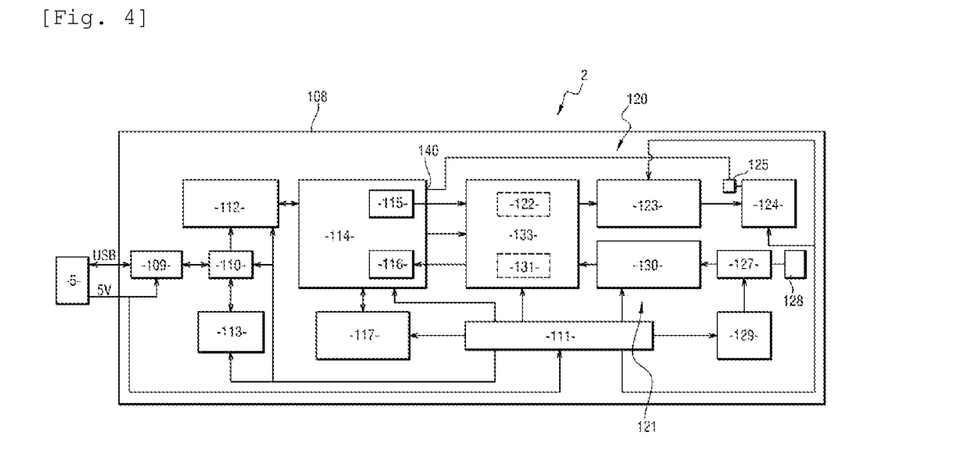
FIG. 4 represents the architecture of the LiFi dongle.
Figure 5:
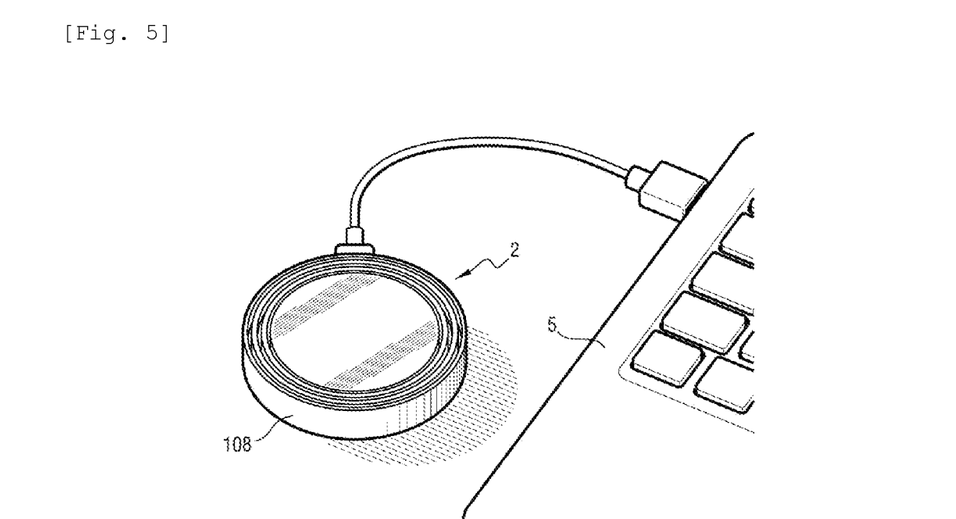
FIG. 5 is a perspective and top view of the Li-Fi dongle connected to a computer.

With reference to FIGS. 4 and 5, the architecture of the LiFi dongle 2 is very similar to that of the LiFi access point 1.

The LiFi dongle 2 has a housing 108 in which second components are integrated.

The second components thus include a DC-DC converter 111, an Ethernet transceiver 112, a baseband modem 114 comprising a digital-to-analog converter 115 and an analog-to-digital converter 116, and a first flash memory 117.

The second components further include a transmission channel 120 and a reception channel 121.

The transmission channel 120 includes a first amplifier stage 122, a second amplifier stage 123, an IR LED 124 and a shutdown circuit 125.

The reception channel 121 includes a PIN photodiode 127, a concentrator 128, a voltage adjustment module 129, a first amplifier stage 130 and a second amplifier stage 131. The first amplifier stage 122 of the transmission channel 120 and the second amplifier stage 131 of the reception channel 121 are integrated in a single component 133 which is an off-the-shelf component.

The second components of The LiFi dongle 2 just mentioned are similar to the equivalent first components of the LiFi 1 access point, and work in much the same way.

The LiFi dongle 2 differs mainly from the LiFi access point 1 on the hardware level in that, instead of the RJ45 female connector 9 and the PoE splitter 10, it has a USB port 109, in this case a USB-C female port, a LAN component 110 (LAN for Local Area Network) and a second flash memory 113.

The LiFi dongle 2 receives from the computer 5 via the USB port 109 a DC supply voltage of 5V as well as incoming digital signals, and transmits outgoing digital signals.

The second flash memory 113 is powered by the DC-DC converter 111 and is connected to the LAN component 110 and the Ethernet transceiver 112.

The USB port 109 and the LAN component 110 allow to connect The LiFi dongle 2 in "Plug and Play" fashion to a peripheral device with a USB A or C port, such as the computer 5.

The role of the shutdown circuit 25 in the LiFi access point 1 is now described in more detail. The role of the shutdown circuit 125 in the Li-Fi dongle 2 is not described because it is identical.

The baseband modem 14 generates transmitted digital signals containing signal frames (including data frames) that the LiFi access point 1 sends to the LiFi dongle 2.

The digital-to-analog converter 15 of the baseband modem 14 generates transmitted analog signals from the transmitted digital signals.

The transmitted analog signals are shaped by the first amplifier stage 22 and by the second amplifier stage 23 of the transmission channel 20, and are then transmitted to the IR LED 24 which produces transmitted light signals comprising the signal frames.

The baseband modem 14 has a GPO A output (GPO for General Purpose Output) 40 which is a binary output (as does the baseband modem 114 which has a GPO A 140).

Figure 6:
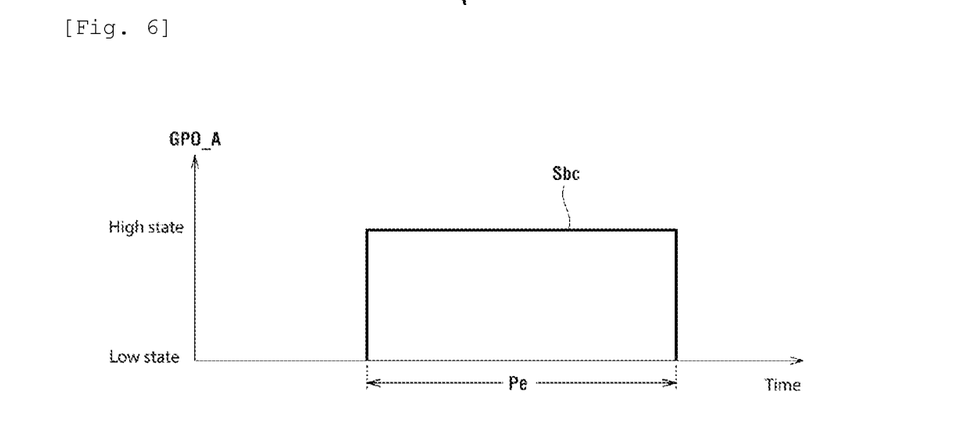
FIG. 6 represents a binary control signal associated with transmission of data frames.

With reference to FIG. 6, the baseband modem 14 generates and applies to the GPO A output 40 a binary control signal Sbc that is in a first state during the periods of transmission Pe by the baseband modem 14 of transmitted digital signals, and in a second state outside the periods of transmission of the transmitted digital signals.

Here, the first state is a high state and the second state is a low state.

The GPO A output 40 simply distinguishes between transmission periods in which the IR LED 24 is expected to transmit transmitted light signals containing the signal frames, and periods in which the IR LED 24 is not expected to transmit such transmitted light signals.

Note that this configuration of the GPO A output 40 is programmed "basic", by default, in the baseband modem 14 which, remember, is an off-the-shelf component.

Figure 7:
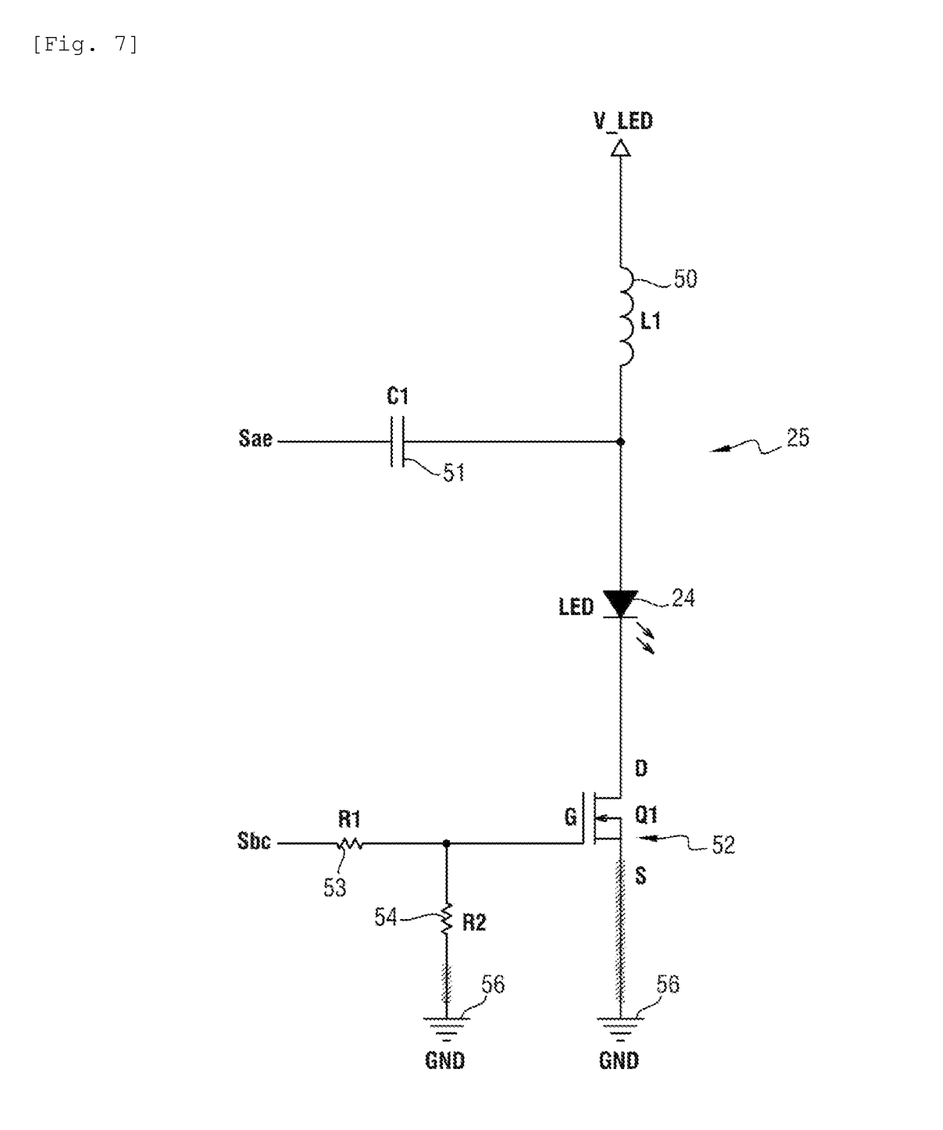
FIG. 7 shows a circuit for switching off the optical wireless communication device according to the invention.

With reference to FIG. 7, the detection circuit 25 is connected to the IR LED 24.

The detection circuit 25 comprises an inductor 50, a capacitor 51, an N-type MOSFET transistor 52, a first resistor 53 and a second resistor 54.

The inductor 50 is connected between a source of a bias voltage V_LED of the IR LED 24 and an anode of the IR LED 24. The capacitor 51 has a terminal connected to the anode of the IR LED 24. The transmitted analog signals Sae are applied to the terminal of capacitor 51 that is not connected to the anode of LED IR 24. The cathode of the IR LED 24 is connected to the electrical ground 56 via the transistor 52. Specifically, the cathode of the IR LED 24 is connected to the drain D of the transistor 52 and the electrical ground 56 to the source S of the transistor 52.

The inductor 50 prevents the transmitted analog signals Sae from going back to the source of the bias voltage V_LED.

The first resistor 53 is a gate resistor of transistor 52, and has one terminal connected to the gate G of transistor 52. The binary control signal Sbc is applied to the other terminal of the first resistor 53. The second resistor 54 has one terminal connected to the gate G of the transistor 52 and one terminal connected to the electrical ground 56. The second resistor 54 is a pull-down resistor which avoids intermediate voltage states on the gate G of transistor 52.

The shutdown circuit 25 enables the IR LED 24 to be turned on (i.e., lit) during transmission periods, and to be turned off (i.e., extinguished) outside the transmission periods.

First, it is assumed that the GPO A output 40 of the baseband modem 14 is not used and that the lower part of the shutdown circuit 25 is not mounted: the cathode of the IR LED 24 is then connected directly to the electrical ground 56. In this case, if a transmitted analog signal Sae is applied to the capacitor 51, it is added to the bias voltage V_LED of the IR LED 24. The IR LED 24 thus transmits transmitted light signals corresponding to this sum of electrical signals. In the case where no analog transmitted signal Sae is applied to the capacitor 51, the IR LED 24 nevertheless transmits a constant transmitted light signal, containing no signal frames, corresponding to the bias voltage V_LED of the IR LED 24. The IR LED 24 is therefore constantly powered and thus consumes power continuously.

When the shutdown circuit 25 is used, on the contrary, the IR LED 24 is activated during the transmission periods and cut off outside the transmission periods thanks to the binary control signal Sbc which controls the transistor 52 which behaves like a switch.

When the binary control signal Sbc is in the first state, i.e., in the high state, this high state is applied to the gate G of the transistor 52, which then operates in saturated mode, which allows the creation of a conduction channel between the drain D and the source S of the transistor 52. The cathode of the IR LED 24 is then connected to the electrical ground 56, which allows it to be powered by the sum of the DC bias voltage V_LED and the transmitted analog signals Sae.

On the contrary, when the binary control signal Sbc is in the second state, i.e., in the low state (outside the transmission periods), this low state is applied to the gate G of the transistor 52 which is in a blocked mode. The cathode of the IR LED 24 is not connected to the electrical ground 56, so that the IR LED 24 is not supplied with any signal.

The IR LED 24 thus consumes electrical power only when it transmits transmitted light signals containing signal frames, i.e., when the LiFi access point 1 transmits the signal frames.

The shutdown circuit 25 and the shutdown circuit 125 therefore significantly reduce the power consumption of the LiFi access point 1 and the LiFi dongle 2 respectively.

The shutdown circuit also helps to ensure the eye safety of users. The shutdown circuit protects a user's eyes when they approach their face to the LiFi Access Point 1 or LiFi Dongle 2.

In general, if an obstacle appears between the LiFi access point 1 and the LiFi dongle 2, then the communication is interrupted. Communication can only be re-established at the initiative of the LiFi access point 1, by the baseband modem 14 transmitting, during search cycles, transmitted digital signals containing search frames for peripheral devices that may be connected to the LiFi access point 1. The transmitted digital signals containing the peripheral device search frames are transformed into transmitted analog signals and then into transmitted light signals.

If these transmitted light signals are received by a peripheral device, for example the LiFi dongle 2, then it transmits light signals in return that contain a connection data frame validating its presence. Otherwise, the search cycle is repeated.

Each search cycle comprises at least one transmission period and at least one silence period, the sum of the silence periods being at least 10 times longer than the sum of the transmission periods, so that during a search cycle the binary control signal assumes the first value for a first duration that is at least 10 times shorter than a second duration during which the binary control signal assumes the second value.

Figure 8:
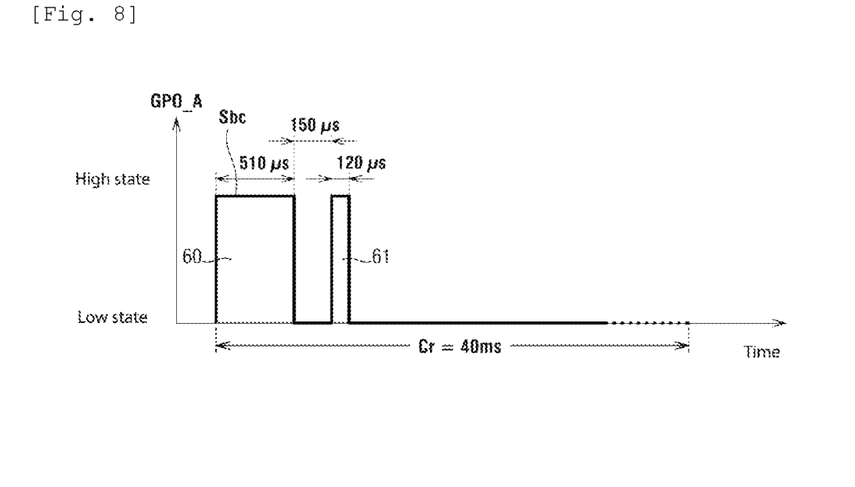
FIG. 8 shows a binary control signal associated with transmission of peripheral device search frames.

FIG. 8 shows an example of a binary control signal Sbc associated with a peripheral device search frame. The duration of the search cycle Cr is equal to 40 ms. The binary control signal Sbc comprises two short pulses including a first pulse 60 (corresponding to a first transmission period) having a duration equal to 510 µs and a second pulse 61 (corresponding to a second transmission period) having a duration equal to 120 µs, the first pulse 60 and the second pulse 61 being spaced by a duration equal to 150 µs. After the communication is interrupted, the LiFi dongle 2, due to its firmware configuration, will send out light signals again only if the communication is re-established at the initiative of the LiFi access point 1 via the transmission of the transmitted light signals that include peripheral device search frames. As long as these transmitted light signals are not received and decoded by the LiFi dongle 2, it remains "silent".

Thus, from the moment the communication is interrupted, the IR LED 124 of The LiFi dongle 2 is turned off. If the obstacle that interrupts the communication is a user who is looking closely at the LiFi dongle 2, this user does not face any eye risk since the IR LED 124 of The LiFi dongle 2 is switched off and remains switched off as long as the user is positioned close to the LiFi dongle 2.

If communication is interrupted due to the presence of a user's face, the LiFi access point 1, on the other hand, will continue to search for the presence of peripheral devices by transmitting transmitted light signals containing the peripheral device search frames. However, even if the user's face is in the vicinity of the LiFi access point 1, despite the transmission of these transmitted light signals, the user's eye safety is ensured because, in each search cycle Cr, the first pulse 60 and the second pulse 61 have a very short duration and are followed by a long "silent" period.

It should be noted here that the massive deployment of a wireless communication technology relies heavily on the miniaturization of the electronic components used to implement it. For example, WiFi function can be implemented with two main components designed to take up little space and consume little power. In the case of LiFi, these miniaturized components do not yet exist. So, discrete electronic off-the-shelf components are used, which are not initially designed for such a use case. The assembly of these components certainly allows to realize the desired functions, but for a larger size, a higher price and a higher power consumption than what can be obtained with miniaturized components. The invention at least allows to solve the problem of the consumption.

Of course, the invention is not limited to the described embodiment but includes any variant falling within the scope of the invention as defined by the claims.

The implemented optical wireless communication is not necessarily a communication according to the LiFi protocol.

It has been indicated here that the light source comprises a LED. The light source could be different and include, for example, a resonant cavity LED or a VCSEL (for vertical-cavity surface-emitting-laser, i.e., a vertical cavity laser diode emitting from the surface). The light source may comprise several similar components, for example several LEDs, or several different components, for example one or more LEDs and one or more VCSELs.

In the case where the light source comprises several LEDs, these can be connected in series or in parallel. In this case, the shutdown circuit of FIG. 7 is the same, the IR LED 24 being replaced by the LEDs connected in series or in parallel.

Similarly, the photoreceptor could be different and include one or more PIN photodiodes, one or more avalanche photodiodes, or a single photon avalanche diode or an array of single photon avalanche diodes.

The use of a baseband modem has been described here, but it is possible to use a different processing component: processor, microcontroller, FPGA, etc. The analog-to-digital converter and the digital-to-analog converter are not necessarily integrated in the processing component.

It has been described here that the optical wireless communication device is integrated into an access point positioned on the ceiling of a room. The architecture of the access point can be different from the one presented here.

The baseband modem as well as the amplification stages could for example be "centralized" and located in a same central equipment connected to a plurality of photonic antennas (including LEDs and photodiodes) positioned on the ceiling of the same room or of different rooms. The photonic antennas are connected to the central equipment by one or more cables including for example a coaxial cable, a power cable, a telephone cable, a plastic fiber, etc. In this architecture, the optical wireless communication device according to the invention is thus integrated in several equipment.

The peripheral equipment that communicates with the access point and in which the optical wireless communication device is integrated is not necessarily a dongle but could be any equipment adapted to communicate via wireless optical communication: computer, tablet, smartphone, connected watch, connected speaker, and so on.

In the case where the optical wireless communication device is integrated in a dongle, it is not necessarily connected to a computer but can be connected to another equipment: tablet, smartphone, connected watch, connected speaker, and so on.

It should be noted that the invention can be implemented in any type of application: home network, industrial network, robotics, inside a car, a train, a plane, and so on.

The invention claimed is:

1. An optical wireless communication device comprising:
   a processing component which is configured to produce transmitted digital signals during transmission periods;
   a digital-to-analog converter arranged to produce transmitted analog signals from the transmitted digital signals;
   a light source which is configured to produce transmitted light signals from the transmitted analog signals;
   a shutdown circuit arranged to selectively activate or deactivate the light source; wherein the processing component comprises a binary output and being arranged to generate and apply to the binary output a binary control signal which is in a first state during the transmission periods and in a second state outside the transmission periods, the shutdown circuit being arranged to receive the binary control signal, and to activate the light source when the binary control signal is in the first state and to deactivate the light source when the binary control signal is in the second state.

2. The communication device as claimed in claim 1, wherein the processing component is a baseband modem.

3. The communication device as claimed in claim 2, wherein the baseband modem is an off-the-shelf integrated circuit originally designed to meet a telecommunications standard.

4. The communication device as claimed in claim 1, wherein the binary output is a GPO output, for "General Purpose Output".

5. The communication device as claimed in claim 1, wherein the shutdown circuit comprises a transistor forming a switch controlled by the binary control signal, and wherein the light source comprises a terminal connected to a source of a bias voltage and a terminal connected to an electrical ground via the transistor.

6. An access point comprising an optical wireless communication device as claimed in claim 1.

7. The access point as claimed in claim 6, wherein the processing component is arranged to transmit, during search cycles, transmitted digital signals containing search frames for searching peripheral devices that may be connected to the access point.

8. The access point as claimed in claim 7, wherein each search cycle comprises at least one transmission period and at least one silence period, a sum of the silence periods being at least 10 times longer than a sum of the transmission periods, such that during a search cycle, the binary control signal is in the first state for a first time period at least 10 times shorter than a second time period during which the binary control signal is in the second state.

9. A peripheral equipment comprising an optical wireless communication device as claimed in claim 1.

10. The peripheral equipment as claimed in claim 9, wherein the optical wireless communication device further comprises a photoreceiver arranged to receive received light signals and to generate received analog signals, and an analog-to-digital converter arranged to generate received digital signals from the received analog signals, the peripheral equipment being arranged to generate transmitted light signals, following a communication outage, only if the processing component previously receives received digital signals comprising peripheral device search frames transmitted by an access point.

11. The peripheral equipment as claimed in claim 9, wherein the peripheral equipment is a dongle.

* * * * *